Patented Dec. 25, 1945

2,391,706

UNITED STATES PATENT OFFICE 2,391,706

METHOD OF FORMING BLOCKING LAYERS ON SELENIUM COATED PLATES

Lloyd R. Jackson and Wendell F. Stewart, Columbus, Ohio, assignors to Battelle Memorial Institute, Columbus, Ohio, a corporation of Ohio No Drawing. Application October 10, 1940, Serial No. 360,636

14 Claims. (Cl. 204—56)

This invention relates to a method of forming blocking layers on selenium coated plates. It is particularly related to rectifiers and condensers containing a layer of selenium and the preparation of blocking layers on selenium-coated plates which are to be used in rectifiers and condensers.

It is known to the prior art that selenium may be used in connection with electrical devices such as rectifiers and condensers. Selenium is particularly useful for these devices since it may be applied in such a manner that the device will have the property of unidirectional electrical conductivity. However, the performance characteristics of these devices may be markedly modified by treatments which may be applied to the selenium. A large number of treatments have been suggested to improve the performance of the selenium used in these devices.

Since the unidirectional electrical characteristics of selenium are usually attributed to the presence of a thin film or blocking layer on the surface of the selenium, most treatments heretofore proposed have involved some type of surface treatment. Coating of the selenium surface with materials such as selenium dioxide, various N-, O-, or S-containing organic compounds and polystyrene and treatment of the selenium surface with various organic reducing agents, sulfur fumes and other materials have been proposed. Combination of the selenium with other materials such as mercury compounds, metal salts or oxides and metal halides has also been suggested. In addition to the combination of these other materials with selenium, heat treatments of selenium rectifier plates at temperatures of 176° F. to the melting point of selenium have been described. While many of these treatments have been satisfactory in certain instances, erratic results have been frequently obtained and research has been continued to find a method for treating selenium rectifier elements which would produce satisfactory and uniform results and superior performance to elements now available.

One of the objects of this invention is to prepare selenium rectifier elements having a blocking layer which will withstand much higher back voltages than any elements of this type now available.

Another object of this invention is to produce selenium rectifying elements which will have a comparatively low resistance in the forward direction and a very high resistance in the reverse or blocking direction.

Another object of this invention is to produce a more effective blocking layer on selenium rectifier plates than has been hitherto obtainable.

Still another object of this invention is to produce selenium rectifying elements which will permit the production of more compact rectifying units than can be produced by prior art methods.

A further object of this invention is to produce a selenium rectifying unit having a higher efficiency and lower power consumption for a given output than present day units.

It is well recognized that the character of the blocking layer formed on selenium rectifying elements has a major influence upon the results obtained. We have found a novel electrolytic treatment, which, when applied to a selenium rectifying element, produces a superior and highly effective blocking layer upon the selenium surface.

The selenium rectifying element itself, which consists of a suitable base plate coated with elemental selenium, may be prepared by any method now known to the art. Then, in accordance with our invention, the base plate is provided with an insulating coating such as one of the numerous resins. The prepared plate is then made the cathode in an electrolyte consisting of nitrobenzene containing chromium trioxide and water in solution. Since only the selenium surface is exposed to the electrolyte, all action takes place at the selenium surface. The selenium of this cathode is then given an electrolytic treatment, after which it is removed from the solution, dried, and a front electrode sprayed on, or otherwise applied to, the electrolytically coated selenium surface. The completed unit is then assembled into a rectifier device according to methods now known to the art.

In studying the performance of dry rectifying elements, the important factors to be considered are:

1. The electrical resistance of the element in the forward or conducting direction.
2. The electrical resistance of the element in the reverse or blocking direction.
3. The blocking voltage which the element can withstand without breakdown.

The electrical resistance in the forward direction determines the current carrying capacity of the unit and one portion of the power lost by heating in the unit. For best results it is obvious that this resistance should be as low as possible. The electrical resistance in the reverse direction is a measure of the efficiency of the rectifying action of the unit and determines the other portion of the power lost by heating in the unit. This electrical resistance in the blocking direction should be as high as possible. The blocking voltage which the elements can withstand without breakdown determines the number of single elements required to rectify a given voltage and hence the overall efficiency of any given type of rectifier. Hence it is desirable that this voltage withstanding capacity of a rectifying element be high.

According to present theories of rectifier action, the valve effect of dry rectifiers is due to a thin film, frequently termed a "blocking layer," on the rectifier plate. The character of this film determines the performance of the rectifier and the three factors which have been previously discussed. Since these factors all depend upon one element (i. e., the blocking layer) it is obvious that they are interdependent and one may be sacrificed to a certain extent if abnormally good results can thereby be obtained with one of the other factors. An example will serve to show how this may be done. The usual type of selenium rectifier now available has a forward resistance of about 2.4 ohms when 0.5 ampere are flowing and will not stand more than about −10 volts in the blocking direction. To make a full-wave bridge type rectifier for a 110 v. A. C. supply 44 plates of this type will be required. Such a rectifier will have a resistance of about 53 ohms in the forward direction when 0.5 ampere is flowing so the resistance drop in the rectifier will be 26 volts and the power loss in the forward direction will be 13 watts.

Now let us assume that it is possible to produce a rectifying element with such a blocking layer that the forward resistance is increased to about 6 ohms when 0.5 amp. is flowing but the blocking resistance is such that the plate only passes 0.004 amp. at −75 volts and the breakdown voltage is −80 to −110 volts. With an element of this type only 8 plates will be required for a 110 v. A. C. supply. Such a rectifier will have a forward resistance of only 24 ohms with 0.5 amp. flowing with a voltage drop of only 12 volts and a power loss of only 6 watts. It is evident that this assumed rectifying element is greatly superior to the present rectifying elements because of its high resistance in the blocking direction and high breakdown voltage and in spite of some increase in forward resistance. By the method of our invention it is possible to produce rectifying elements having properties equal to or superior to the assumed element discussed above.

In the preparation of rectifiers or condensers by our improved method, the following steps are preferably involved:

1. Preparation of selenium coated plate.
2. Preparation of the electrolytic bath.
3. Electrolytic treatment of the rectifying element.
4. Completion of the rectifying element.

PREPARATION OF SELENIUM COATED PLATE

A suitable base plate is prepared by any conventional method. For example, a nickel plate may be sand-blasted to give it a suitably receptive surface. Properly purified selenium is then applied to the base plate. As is usual with rectifiers of this type, care must be taken to see that there are no openings or pin-holes in the selenium layer and that a smooth, uniform coating is obtained. After coating with selenium, the element is aged at an elevated temperature, with the selenium surface subjected to pressure, for a period of time. The pressure is then removed and the aging at elevated temperature continued for a second period. This type of aging treatment is already well known to the prior art and constitutes no part of this invention. At the conclusion of this aging treatment the element is allowed to cool to room temperature.

Prior to electrolytic treatment all surfaces of the rectifying element except those composed of selenium must be provided with an insulating covering so that, upon subsequent electrolysis, all action takes place at the surface of the selenium and the electric current is not short-circuited through the base plate. One suitable method for doing this is to coat the non-selenium surfaces with a Bakelite type resin which may be baked on. Other resins and other coating materials may also be used provided they have insulating properties and are substantially insoluble in the electrolyte which is used. When thus coated, the element is ready for electrolytic treatment.

PREPARATION OF ELECTROLYTE

The base for the electrolyte of our invention is nitrobenzene. Chromium trioxide together with a little water constitute the added ingredients. It appears probable that the chromium trioxide and water react to form chromic acid ($H_2CrO_4$) or dichromic acid ($H_2Cr_2O_7$). For convenience in calculation, it has been considered that the chromium trioxide and the water are present as $H_2Cr_2O_7$ ($H_2O \cdot 2CrO_3$) but it is not to be understood that they are definitely combined in this form. Calculated as $H_2Cr_2O_7$ the saturation figure in nitro-benzene is around 2.27 g./l. at 75° F. or about 0.2 per cent by weight. The electrolyte is operable with any amount of $H_2Cr_2O_7$ up to saturation but is superior with increasing amounts since its conductivity increases logarithmically with increasing $H_2Cr_2O_7$. For this reason a saturated solution produces the best results and in practice it is desirable to have a slight excess of $H_2Cr_2O_7$ present so as to replace that which is used up during electrolysis. With this slight excess more uniform operating conditions can be obtained.

It is possible to produce a "super-saturated" solution by agitation of the electrolyte with an excess of $H_2Cr_2O_7$. This solution will produce a highly effective blocking layer upon a selenium plate electrolytically treated therein but the forward resistance of the rectifying element is unduly increased. By stopping the agitation and allowing the excess $H_2Cr_2O_7$ to settle out, the usual excellent results obtained with a saturated solution may be obtained.

If water is added to the electrolyte in excess of its solubility limit, the excess separates from the nitro-benzene and tends to wash or leach out some of the $H_2Cr_2O_7$ from the electrolyte and causes the electrolyte to increase in resistance. It will thus be seen that while our electrolyte will work with any concentration of $H_2Cr_2O_7$ between a very low amount and saturation, the optimum performance appears to be obtained at about saturation. Provision for keeping the bath saturated, as by having excess $H_2Cr_2O_7$ present is desirable to maintain constant operating conditions.

The electrolyte will contain chromium trioxide and water in the ratio $$\frac{H_2O}{CrO_3} = \frac{1}{2}$$

or less. At an operating temperature of 130° F., the maximum temperature at which it is desired to use the electrolyte, the saturation value of $H_2Cr_2O_7$ is approximately 2.5 grams per liter. Since a molecule of water is present, 2.3 grams per liter of $CrO_3$ would be present in the electrolyte. Based on the ratio of water to chromium trioxide in the electrolyte, there would be less than 1.2 grams of water per liter present.

ELECTROLYTIC TREATMENT

When the rectifier element and the electrolyte have been properly prepared, the element is placed in the electrolyte and made the cathode while an insoluble anode is provided to complete the electrical circuit. These electrodes are then connected with a suitable direct current supply to produce the desired electrolytic film formation. In this treatment the important factors are:

1. The forming voltage.
2. The time of treatment.
3. The electrolyte temperature.

Each of these will be discussed in some detail.

FORMING VOLTAGE

In studying voltage-current relationships in this electrolytic treatment, it has been found easier to make comparisons on the basis of the forming voltage rather than on the current density of the treatment due to the constantly changing value of the latter during the process of forming the blocking layer. Table I shows the effect of different forming voltages under otherwise identical conditions. It will be seen that as the forming voltage increases the effectiveness of the blocking layer likewise increases although at the expense of some increase in the forward resistance. It is believed that this increase in resistance in both directions is due to the thickening of the blocking layer.

Table I

EFFECT OF FORMING VOLTAGE ON THE ELECTROLYTIC PRODUCTION OF BLOCKING LAYERS ON SELENIUM RECTIFIER PLATES

| Forming conditions | | Results with completed plates | | | | |
|---|---|---|---|---|---|---|
| Forming voltage | Time of application of forming voltage | Volts to pass 0.5 amp. in forward direction | Amperes in blocking direction | | | |
| | | | −10 v. | −25 v. | −70 v. | −115 v. |
| | Minutes | | | | | |
| 44 | 8 | 1.8 | 0.0030 | 0.0100 | | |
| 110 | 8 | 2.9 | | 0.0005 | 0.009 | |
| 300 | 8 | 10.0 | | | | 0.0030 |

This forming voltage is a very important factor in determining the final characteristics of the finished cell. The general rule is that, as the forming voltage is increased, the effectiveness of the blocking layer and the forward resistance likewise increase. Since these latter two factors are so closely related in that an excessive increase in forward resistance defeats improvement in the blocking layer, it is important to hold down the forward resistance while improving the effectiveness of the blocking layer. To do this it has been found that the application of a gradually increasing forming voltage is effective. To understand the reason for the effectiveness of this changing voltage it is necessary to understand the mechanism of the formation of the blocking layer.

When electrolytes of relatively high conductivity are used with a constant forming voltage, good blocking layers are formed but the forward resistance is increased to an undesirable extent. Under these conditions the initial current surge is high and most of the current passes through the spots of least resistance on the selenium layer and this causes unduly thick blocking layers to form at these points. When these spots form a blocking layer which is comparatively high in resistance the current becomes more evenly distributed and forms a blocking layer on the remaining surface. By this time the resistance of the blocking layer has become an important part of the total resistance of the circuit and the potential across this layer is an appreciable portion of the forming voltage. This final high potential seals all the weak spots in the blocking layer. Solutions of high resistance (low $H_2Cr_2O_7$ content) are thus poorer in their action than high conductivity solutions since the final potential across the blocking layer with these solutions can never be as high as with the high conductivity solutions.

Now if the initial current surge is prevented by decreasing the initial forming voltage, the abnormally thick blocking layer on portions of the rectifying element is eliminated and a more uniform blocking layer may be obtained. Then the forming voltage may be increased to obtain the desired sealing action in the final phase of the electrolytic treatment. By following this procedure it is possible to obtain plates which will withstand very high back voltages and yet will be normal in forward resistance. In one such treatment an element was initially treated at 100 volts and this was increased to 200 volts in 2 minutes followed by 6 minutes at 200 volts. The completed plate passed 0.0018 amp. at −115 volts and 0.5 amp. at +3.1 volts. The superiority of this variable voltage treatment over the fixed voltage treatment can be seen by comparing these results with those of Table I.

FORMING TIME

A series of plates were treated at varying times with other conditions constant. Table II shows the results obtained with a constant forming voltage of +110 volts. Samples were treated at times of 3 seconds to 20 minutes. The very short times formed rather weak layers and it was not possible to get consistent results for periods of less than 4 minutes. In all cases the forward resistance was increased to about the same value for treating times less than 4 minutes and there was a slow rise in blocking efficiency with increase in treating time. Above 4 minutes and up to 8 minutes the blocking resistance increases over three times while the forward resistance increases only 20 per cent, while any treating time longer than 8 minutes did not improve the blocking layer appreciably but merely caused an increase in the forward resistance.

Table II
EFFECT OF FORMING TIME ON THE ELECTROLYTIC PRODUCTION OF BLOCKING LAYERS ON SELENIUM RECTIFIER PLATES

| Forming condition; time of application of forming voltage | Results with completed plate ||
|---|---|---|
| | Volts to pass 0.5 amp. in the forward direction | Amperes in blocking direction at −70 v. |
| *Minutes* | | |
| 4 | 2.4 | 0.035 |
| 5 | 2.6 | 0.030 |
| 6 | 2.6 | 0.022 |
| 7 | 2.9 | 0.017 |
| 8 | 2.9 | 0.010 |

ELECTROLYTE TEMPERATURE

A series of rectifier elements were treated in a saturated solution of $H_2Cr_2O_7$ in nitro-benzene for 8 minutes at 100 volts. The results are shown in Table III. It can be seen that a hot electrolyte is undesirable. With a bath temperature of only 130° F. the resistivity of the solution was lowered and the current density increased accordingly. Dark brown spots deposited very irregularly over the surface and a sludge formed rapidly on the bottom of the container while there appeared to be an accelerated decomposition of the electrolyte, especially during electrolysis. At lower temperatures these effects rapidly disappear. Only a very slight difference was measurable between plates made at 85° F. and at lower temperatures. There was some tendency for the plates treated at the lower temperatures to have a less effective blocking layer than plates treated at room temperature. After standing at room temperature for a few days the cells treated at 40° F. to 90° F. had only a slight variation in characteristics, with those treated at 85° F. still showing somewhat better electrical properties. Thus ordinary temperatures appear to offer the best results. For this reason it is best to make certain that resistive power losses in the bath do not cause it to overheat. Cooling coils in the bath may be used to remove excess heat if necessary.

Table III
EFFECT OF TEMPERATURE OF ELECTROLYTE ON THE ELECTROLYTIC PRODUCTION OF BLOCKING LAYERS ON SELENIUM RECTIFIER PLATES

| Forming condition; electrolyte temperature, ° F. | Results with completed plate |||
|---|---|---|---|
| | Volts to pass 0.5 amp. in the forward direction | Amperes in blocking direction ||
| | | −10 volts | −70 volts |
| 40 | 3.1 | | 0.0050 |
| 84 | 3.0 | | 0.0003 |
| 130 | 3.0 | 0.1000 | |

COMPLETION OF PLATE

After the improved blocking layer of our invention is formed on the rectifying element, the element is removed from the electrolyte, washed and dried. A front electrode is then applied over the blocking layer. As an example, a layer of Wood's metal may be sprayed over the blocking layer. The sprayed unit may then be assembled into a rectifier unit in accordance with methods now known to the art.

Rectifiers have been prepared from these elements treated in accordance with our invention and used under a variety of conditions. No breakdowns occurred during use. Their maximum efficiency is about at the safe continuous capacity but the efficiency remains about the same even when the unit delivers about four times its rated power. This constancy of efficiency is a highly desirable feature. It will thus be seen that we have produced a satisfactory rectifier element which has properties greatly superior to elements now available and which gives a greatly improved performance.

It will be seen from the above that we have provided a novel type of rectifier and condenser and a novel method of preparing a blocking layer for a rectifier or condenser containing a layer of selenium which has important advantages that appear from the above description and from the appended claims.

Having thus described our invention, what we claim is:

1. The method of treating a selenium surface to produce a blocking layer capable of withstanding a breakdown voltage in excess of 70 volts, which comprises treating said selenium surface cathodically in an electrolyte composed essentially of nitro-benzene and containing chromium trioxide in amounts up to 2.3 grams per liter and less than 1.2 grams of water per liter.

2. The process of forming a blocking layer on a selenium rectifier element, which comprises making the selenium surface a cathode in an electrolyte composed essentially of nitro-benzene and containing in solution enough chromium trioxide and water, the total concentration of said water being less than 1.2 grams per liter, to render the electrolyte sufficiently conductive to pass the desired forming current, and applying a D. C. forming voltage of sufficient intensity and for a sufficient length of time to produce a blocking layer on said selenium surface.

3. The process of forming a blocking layer on a selenium rectifier element, which comprises making the selenium surface a cathode in an electrolyte composed essentially of nitro-benzene and containing in solution enough chromium trioxide and water, the total concentration of said water being less than 1.2 grams per liter, to render the electrolyte sufficiently conductive to pass the desired forming current, and applying a D. C. forming voltage for a sufficient length of time to produce a blocking layer on the selenium surface, said D. C. forming voltage being greater than the maximum blocking voltage the element is to withstand in service.

4. The process of forming a blocking layer on a selenium rectifier element, which comprises making the selenium surface a cathode in an electrolyte composed essentially of nitro-benzene and containing in solution enough chromium trioxide and water, the total concentration of said water being less than 1.2 grams per liter, to render the electrolyte sufficiently conductive to pass the desired forming current, and applying for a period exceeding 4 minutes a D. C. forming voltage of between 44 and 300 volts.

5. The process of forming a blocking layer on a selenium rectifier element, which comprises making the selenium surface a cathode in an electrolyte composed essentially of nitro-benzene and containing in solution enough chromium trioxide and water, the total concentration of said water being less than 1.2 grams per liter, to render the electrolyte sufficiently conductive to pass the desired forming current, and applying for a period of more than 4 minutes and at a temperature of less than 130° F. a D. C. forming voltage of between 44 and 300 volts.

6. The process of forming a blocking layer on a selenium rectifier element, which comprises making the selenium surface a cathode in an electrolyte composed essentially of nitro-benzene and containing in solution enough chromium trioxide and water, the total concentration of said water being less than 1.2 grams per liter, to render the electrolyte sufficiently conductive to pass the desired forming current, and applying at a temperature of less than 130° F. a gradually increasing D. C. forming voltage of between 44 and 300 volts.

7. The process of forming a blocking layer on a selenium rectifier element, which comprises the steps of making the selenium surface a cathode in an electrolyte composed essentially of nitro-benzene and containing in solution enough chromium trioxide and water, the total concentration of said water being less than 1.2 grams per liter, to render the electrolyte sufficiently conductive to pass the desired forming current, applying at a temperature of less than 130° F. a D. C. forming voltage of less than 100 volts for a sufficient length of time to permit the current to become stabilized, and then increasing said voltage to a value less than 300 volts and applying it until the current again becomes stabilized.

8. The process of forming a blocking layer on a selenium rectifier element, which comprises making the selenium surface a cathode in an electrolyte composed essentially of nitro-benzene and containing up to 2.3 grains per liter of chromium trioxide and less than 1.2 grams per liter of water, the chromium trioxide and water being present in amounts great enough to render the electrolyte sufficiently conductive to pass the desired forming current, and applying for more than 4 minutes and at a temperature of less than 130° F. a D. C. forming voltage of between 44 and 300 volts.

9. The process of forming a blocking layer on a selenium rectifier element, which comprises making the selenium surface a cathode in an electrolyte composed essentially of nitro-benzene and containing up to 2.3 grams per liter of chromium trioxide and less than 1.2 grams per liter of water, the chromium trioxide and water being in an approximate ratio not exceeding

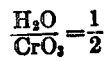
$$\frac{H_2O}{CrO_3} = \frac{1}{2}$$

and present in amounts great enough to render the electrolyte sufficiently conductive to pass the desired forming current, and applying for more than 4 minutes and at a temperature under 130° F. a D. C. forming voltage of between 44 and 300 volts.

10. The process of forming a blocking layer on a selenium rectifier element, which comprises making the selenium surface a cathode in an electrolyte composed essentially of nitro-benzene saturated with chromium trioxide and water in an amount less than 1.2 grams per liter, and applying for more than 4 minutes and at a temperature below 130° F. a D. C. forming voltage of between 44 and 300 volts.

11. An electrolyte for treating selenium rectifier elements, said electrolyte being composed essentially of nitro-benzene and containing in solution enough chromium trioxide and water, the total concentration of said water being less than 1.2 grams per liter, to render the electrolyte sufficiently conductive to pass a current of approximately 0.01 ampere at voltages in excess of 44 volts.

12. An electrolyte for treating selenium rectifier elements, said electrolyte being composed essentially of nitro-benzene and containing up to 2.3 grams per liter of chromium trioxide and less than 1.2 grams per liter of water, the chromium trioxide and water being present in amounts great enough to render the electrolyte sufficiently conductive to pass a current of approximately 0.01 ampere at voltages of more than 44 volts.

13. An electrolyte for treating selenium rectifier elements, said electrolyte comprising essentially nitro-benzene and containing up to 2.3 grams per liter of chromium trioxide and less than 1.2 grams per liter of water, the chromium trioxide and water being in an approximate ratio not exceeding

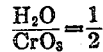
$$\frac{H_2O}{CrO_3} = \frac{1}{2}$$

and present in amounts great enough to render the electrolyte sufficiently conductive to pass a current of approximately 0.01 ampere at voltages of more than 44 volts.

14. An electrolyte for treating selenium rectifier elements, said electrolyte being composed essentially of nitro-benzene saturated with chromium trioxide and water in an amount less than 1.2 grams per liter.

LLOYD R. JACKSON.
WENDELL F. STEWART.